US012607174B2

(12) United States Patent
Groh

(10) Patent No.: US 12,607,174 B2
(45) Date of Patent: Apr. 21, 2026

(54) PUMP DEVICE

(71) Applicant: HYDAC Fluidtechnik GmbH,
Sulzbach Saar (DE)

(72) Inventor: Christian Groh, Gersheim (DE)

(73) Assignee: HYDAC FLUIDTECHNIK GMBH

( * ) Notice: Subject to any disclaimer, the term of this
patent is extended or adjusted under 35
U.S.C. 154(b) by 351 days.

(21) Appl. No.: 18/261,915

(22) PCT Filed: Dec. 21, 2021

(86) PCT No.: PCT/EP2021/086930
§ 371 (c)(1),
(2) Date: Jul. 18, 2023

(87) PCT Pub. No.: WO2022/156979
PCT Pub. Date: Jul. 28, 2022

(65) Prior Publication Data
US 2024/0077066 A1 Mar. 7, 2024

(30) Foreign Application Priority Data
Jan. 22, 2021 (DE) ..................... 10 2021 000 327.6

(51) Int. Cl.
*F04B 17/04* (2006.01)
*F16K 31/122* (2006.01)

(52) U.S. Cl.
CPC ............ *F04B 17/044* (2013.01); *F04B 17/04*
(2013.01); *F16K 31/1221* (2013.01)

(58) Field of Classification Search
CPC ..... F04B 17/04; F04B 17/044; F16K 31/1221
(Continued)

(56) References Cited

U.S. PATENT DOCUMENTS 1,663,687 A * 3/1928 Down ................... F04B 49/243
137/540
1,709,906 A * 4/1929 Farmer .................. F04B 39/08
417/466
(Continued)

FOREIGN PATENT DOCUMENTS

DE 35 04 789 8/1986 .............. F04B 17/04
DE 10 2012 010980 12/2013 .............. F01N 3/24
DE 10 2018 125058 4/2020 ............. F02M 37/00

OTHER PUBLICATIONS

Search Report for International Application No. PCT/EP2021/
086930, 4 pages, Feb. 24, 2022.

*Primary Examiner* — Christopher S Bobish
(74) *Attorney, Agent, or Firm* — Slayden Grubert Beard
PLLC

(57) ABSTRACT

The invention relates to a pump device comprising a pump
piston (12) which is longitudinally movable in a pump
housing (10) and which, controlled by a magnetic actuation
apparatus (14), acts on an inlet valve (16) and an outlet valve
(18), the inlet valve (16) opening during the intake stroke of
the pump piston (12), and the outlet valve (18) opening
during the delivery stroke thereof. The inlet valve (16) has
an annular valve piston (20) which encompasses the pump
housing (10) which has an entry point (22) and an exit point
(24) for fluid. The valve piston (20) has a pressure-sensing
surface (26) which is controlled by the pump piston (12) in
such a way that, during the intake stroke, the pressure-
sensing surface (26) of the valve piston (20) is moved
counter to the action of an energy store (28) in the movement
direction of the pump piston (12) and in the process vacates
a fluid path into a pump chamber (30) of the pump housing
(10) by means of the pump piston (12) and, during the
delivery stroke, the valve piston (20) of the inlet valve (16),
under the action of the energy store (28) and the pressure- (Continued)

sensing surface (26), blocks this fluid path and opens the outlet valve (18).

23 Claims, 2 Drawing Sheets

(58) Field of Classification Search
USPC ............... 417/298, 457, 466, 467, 506, 507
See application file for complete search history.

(56)                         References Cited

U.S. PATENT DOCUMENTS

| | | | | | |
|---|---|---|---|---|---|
| 2,763,425 | A | * | 9/1956 | Knute ................... | F04B 49/243 |
| | | | | | 92/60 |
| 2,973,132 | A | * | 2/1961 | Hirsch ................... | F04B 49/03 |
| | | | | | 417/286 |
| 3,166,236 | A | * | 1/1965 | Michener ............... | F04B 49/03 |
| | | | | | 417/454 |
| 3,533,429 | A | * | 10/1970 | Shoulders .............. | F01L 17/00 |
| | | | | | 123/188.5 |
| 3,915,597 | A | * | 10/1975 | Grant ...................... | F04B 39/12 |
| | | | | | 417/490 |
| 4,743,179 | A | | 5/1988 | Waas ............................ | 417/415 |
| 8,365,697 | B2 | * | 2/2013 | Cleeves ................... | F01L 7/00 |
| | | | | | 123/188.5 |
| 9,309,877 | B2 | * | 4/2016 | Stein ........................ | F04B 53/10 |
| 9,366,249 | B2 | * | 6/2016 | Gaertner ............ | F04B 53/1032 |
| 11,211,858 | B2 | * | 12/2021 | Koyama ............... | F04B 35/045 |
| 11,264,884 | B2 | * | 3/2022 | Kawai ...................... | H02K 7/14 |
| 12,083,844 | B2 | * | 9/2024 | Koyama .............. | B60G 17/052 |
| 2015/0159530 | A1 | | 6/2015 | Groh ........................ | F01N 3/2066 |
| 2019/0112959 | A1 | | 4/2019 | Xi .............................. | F01N 3/20 |
| 2019/0149029 | A1 | * | 5/2019 | Kawai ................... | H02K 33/16 |
| | | | | | 417/416 |

* cited by examiner

PUMP DEVICE

CROSS-REFERENCE TO RELATED APPLICATIONS

This application claims priority to German Patent Application No. DE 10 2021 000 327.6, filed on Jan. 22, 2021 with the German Patent and Trademark Office. The contents of the aforesaid patent application are incorporated herein for all purposes.

TECHNICAL FIELD

The invention relates to a pump device having a pump piston which is longitudinally movable in a pump housing and which, controlled by an actuating solenoid device, acts on an inlet valve and an outlet valve, the inlet valve opening during the intake stroke of the pump piston and the outlet valve opening during the delivery stroke thereof.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

DE 10 2018 001 523 A1 discloses a device for providing fluids under a predefinable pressure for the pressure supply of a consumer, such as a working unit of an SCR (selective catalytic reduction) system for treating the exhaust gas of internal combustion engines, having at least one pump device which, in a fluid circuit formed between a fluid reservoir and a consumer, draws the fluid in question from the fluid reservoir and feeds said fluid to the consumer. The known pump device requires a conventional pressure supply in the form of a drivable hydraulic pump for its operation. The advantage of the known pump device is that during downtime periods under freezing conditions there is little or no freezable fluid, regularly in the form of an aqueous urea solution (Adblue), in the pump which could freeze and in this respect damage parts of the pump device until they become unusable. DE 10 2019 000 488 A1 shows a comparable device for providing a fluid under a predefinable pressure, the said pump delivery device being supplied in turn for its operation by means of a drivable hydraulic pump.

DE 10 2012 010 980 A1 discloses a system for exhaust-gas treatment in an internal combustion engine, having a generic pump device which can be controlled electromechanically by an actuating solenoid for a metered supply of a freezable substance, in particular in the form of an aqueous urea solution. As protection against damage to the system due to volume expansion when the substance freezes, a compensating device is used which acts on a fluid or pump chamber in such a manner that it compensates volume expansion of the substance within this fluid or pump chamber which is associated with an increase in fluid pressure during freezing.

SUMMARY

A need exists to provide pump devices providing a high degree of functional reliability and which can for example be implemented in a space-saving and cost-effective manner. The need is addressed by the subject matter of the independent claims. Embodiments of the invention are described in the dependent claims, the following description, and the drawings.

DESCRIPTION

Figure 1:
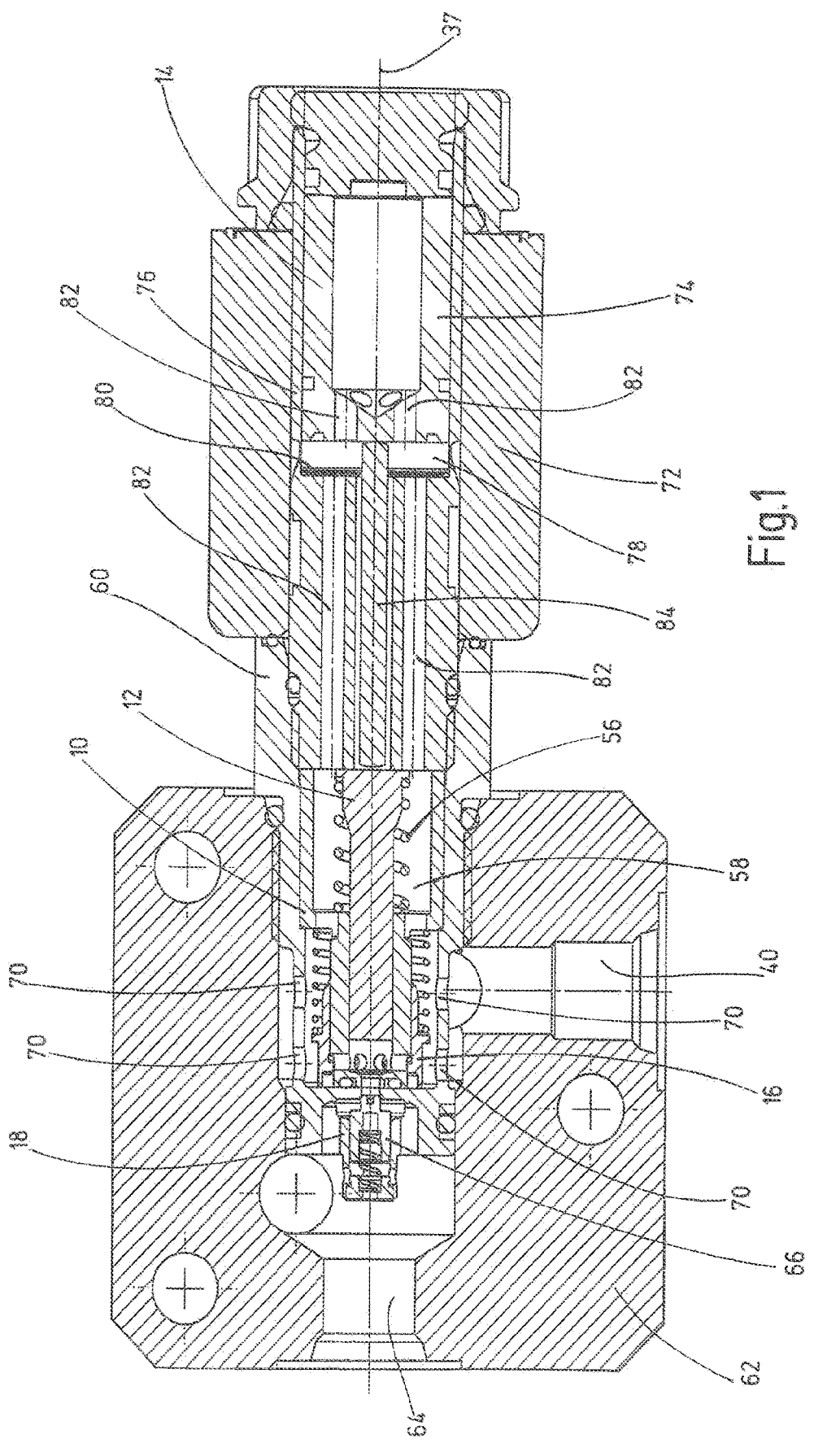
FIG. 1 a longitudinal section through an example pump device as a whole.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the inlet valve has an annular valve piston which encompasses the pump housing which has an entry point and an exit point for fluid. The valve piston has a pressure-sensing surface which is controlled by the pump piston in such a manner that, during the intake stroke, the pressure-sensing surface of the valve piston is moved counter to the action of an energy accumulator in the movement direction of the pump piston and in the process vacates a fluid path into a pump chamber of the pump housing by means of the pump piston. During the delivery stroke, the valve piston of the inlet valve, under the action of the energy accumulator and the pressure-sensing surface, blocks this fluid path and opens the outlet valve. The pump piston which is controllable by means of the actuating solenoid device is coupled to the valve piston together with its pressure-sensing surface in such a manner that, during a pump movement by means of the pump piston, the valve piston is positively repositioned and automatically controls the inlet process of the inlet valve formed in this respect.

The said coupling may be exclusively pressure controlled. Thus, during the intake stroke of the pump piston, towards the actuating solenoid device and away from the outlet valve, there is an increase in the intake volume in the pump chamber, with the result that, due to the resulting suction effect, the pressure-sensing surface also comes under the influence of this suction effect and, counter to the action of the energy accumulator, e.g., in the form of a compression spring, synchronously follows the return stroke of the pump piston; likewise towards the actuating solenoid device and directed away from the outlet valve. During the relevant intake stroke movement of the pump piston, the fluid path between the pump chamber and a fluid supply is opened by the simultaneous movement of the valve piston so that the pump chamber can fill completely with fluid from the fluid supply. During the subsequent reversing movement of the pump piston by means of the actuating solenoid device, fluid from the pump chamber is applied under fluid pressure towards the pressure-sensing surface, which blocks the fluid path referred to for fluid supply and at the same time the outlet valve is opened via the fluid displaced from the pump chamber and fluid is discharged under pressure from the pump chamber towards the exit point for fluid and via the outlet valve, which is in this respect opened, while the inlet valve is closed, towards a fluidic consumer which is to be supplied with fluid of predefinable pressure that can also be a system for exhaust-gas treatment. After passing through the delivery stroke, the pump piston reverses again under the influence of the actuating solenoid device and a new intake stroke takes place.

In some embodiments of the pump device, it is provided that the valve piston of the inlet valve is guided along a guide surface on the outer circumferential surface of the pump housing and that the valve piston has a protrusion on its inner side directed towards the pump housing, which protrusion forms the pressure-sensing surface that extends transverse to the longitudinal axis of the pump piston. Thanks to the aforementioned guidance of the valve piston on the pump housing, this avoids obstructions during operation and thus enables functionally reliable use. Safe, low-cavitation incident flow is achieved due to the arrangement of the pressure-sensing surface transverse to the longitudinal axis of the pump piston.

In some embodiments, it is provided that the protrusion of the valve piston is guided along a corresponding recess in the pump housing and that, in the unactuated state of the valve piston, the fluid path between the pump chamber and a fluid supply is blocked. In this way, safe control of the fluid path is achieved with the purpose of enabling or blocking a fluid supply.

In some embodiments of the pump device, it is provided that, in the unactuated state, the protrusion of the valve piston with its axial overall length at least partially covers a passage, for example in the form of a row of holes, in a pump housing as the entry points and part of the fluid path and, in the actuated state, passes over this passage and unblocks the fluid path to the fluid supply. In this way, control of the fluid path can be achieved in a space-saving manner. The synchronous movement of valve piston and pump piston results in rapid opening and closing movements for fluid supply and discharge.

In some embodiments of the pump device, it is provided that the valve piston has on its free end face side, which is directed towards the outlet valve, an annular recess which is permanently connected to the fluid supply in a fluid-conducting manner in each travel position of the valve piston. Due to this permanent fluid supply, immediate enabling for the fluid path is achieved by means of the valve piston of the inlet valve.

In some embodiments of the pump device, it is provided that the valve piston has a further annular recess into which the passage in the pump housing opens in each travel position of the valve piston, and that the two annular recesses of the valve piston are spatially separated from each other by the internal protrusion with the pressure-sensing surface. The annular chambers, each of which can be controlled by the fluid pressure, are accommodated in the valve piston in a space-saving manner and allow the valve piston to be controlled in a pressure-balanced manner in each case in rapid chronological succession, which benefits functional reliability. This is all helped by the fact that the valve piston has, on its outer circumferential surface, an engagement surface for the energy accumulator in the form of a compression spring which is supported with its other free end on the pump housing. In cooperation with the actuating solenoid device, the valve piston can thus be controlled in such a way in rapid succession, depending on the displacement movements of the pump piston, with all actuating forces for the movable components being arranged parallel to one another, resulting in energy savings during operation.

In some embodiments of the pump device, it is provided that the pump piston in the unactuated state is in a rearward starting position by means of a further energy accumulator, for example in the form of a further compression spring, in which rearward starting position the pump chamber takes up its largest pump volume, and in that, in the actuated state, the pump piston in the course of the delivery stroke delivers this pump volume in a forward movement via the exit point and the outlet valve. In this manner, virtually continuous input and output of fluid quantities into and out of the pump chamber is possible with the pump piston. To achieve a short fluid path, it is thus beneficial for these fluid quantities to run towards the outlet valve transverse to the fluid path via the passage in the pump housing. In this respect, too, it enables low-cavitation operation with the pump device.

For unobstructed operation, it has also proven beneficial for the actuating solenoid device to have a solenoid armature which can be actuated via an energisable coil that acts on the pump piston via a rod part. However, it is also possible to extend the pump piston accordingly or to provide it as an integral component with the rod part in order to achieve a rapid succession of pump piston movements in cooperation with the further energy accumulator.

The pump device is explained in greater detail below according to embodiments with reference to the drawings. The drawings illustrate principles and are not to scale. Specific references to components, process steps, and other elements are not intended to be limiting. Further, it is understood that like parts bear the same or similar reference numerals when referring to alternate FIGS.

The pump device shown as a whole in longitudinal section in FIG. 1 has a pump housing 10 with a pump piston 12 arranged so as to be longitudinally movable therein. The pump piston 12 is controlled by an actuating solenoid device 14 and acts in this respect on an inlet valve 16 and an outlet valve 18. The inlet valve 16 opens on the intake stroke of the pump piston 12 during which, when viewed in the direction of FIG. 1, the pump piston moves from a left-hand to a right-hand stop position shown in FIG. 1. When the pump piston 12 moves fully to the left from its right-hand stop position in the delivery stroke as shown in FIG. 1, the outlet valve 18 opens.

Figure 2:
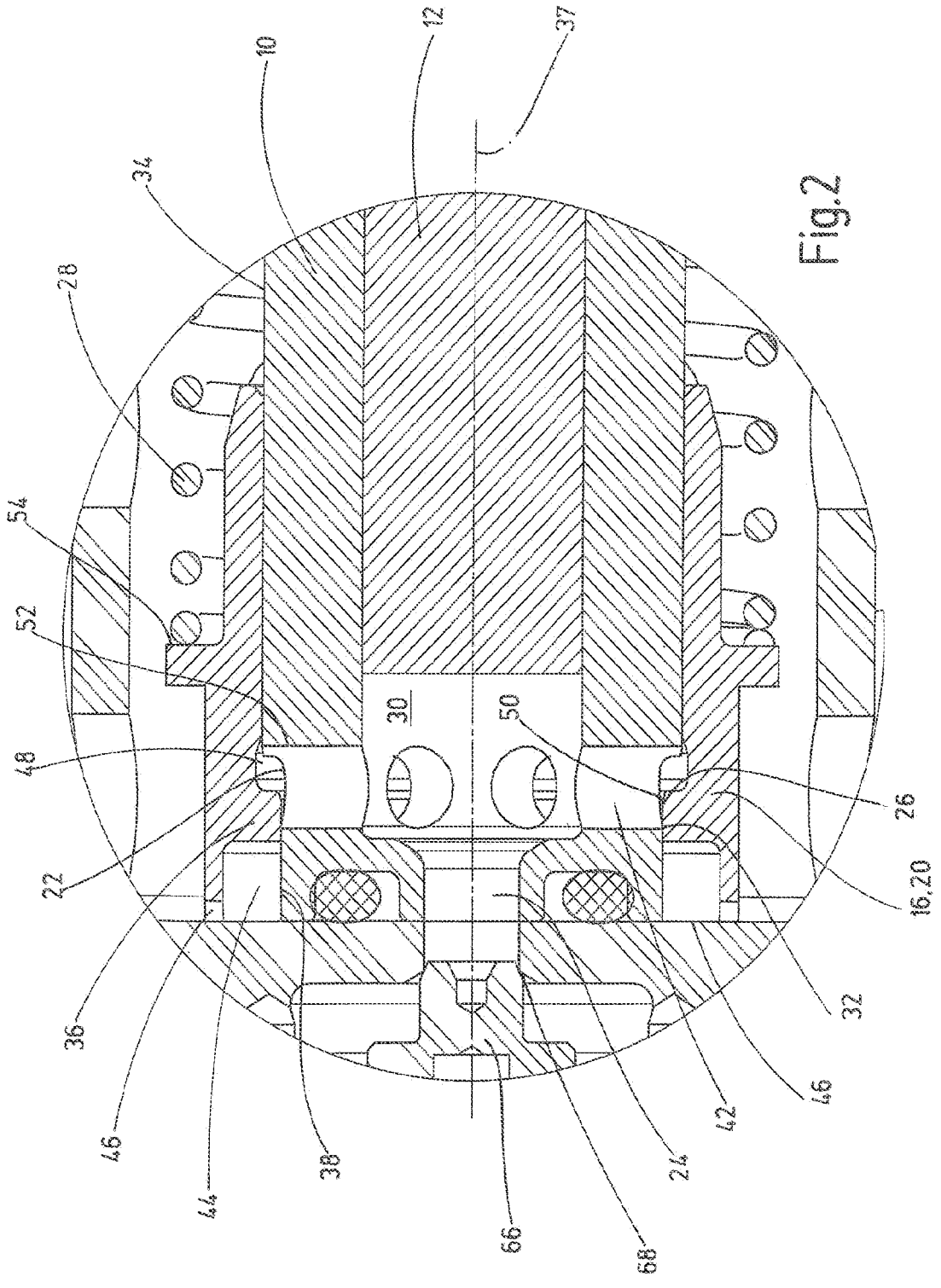
FIG. 2 an enlarged detail of the example pump device according to FIG. 1 with the inlet valve and components of the outlet valve.

As shown in particular in FIG. 2, the inlet valve 16 has an annular valve piston 20 which encompasses the pump housing 10. The pump housing 10 further has an entry point 22 for fluid to enter as well as an exit point 24 for the fluid quantity to be discharged which is conveyed towards the exit point 24 by means of the pump piston 12. As FIG. 2 further shows, the valve piston 20 has an annular pressure-sensing surface 26 which is controlled by the pump piston 12 in such a manner that during the intake stroke of the pump piston 12, i.e. during its movement from left to right when viewed in the direction of FIG. 1, the pressure-sensing surface 26 and thus the valve piston 20 itself is moved to the right counter to the action of an energy accumulator in the form of the compression spring 28. As a result of the aforementioned intake stroke by means of the pump piston 12, a vacuum is created in a pump chamber 30, which is bounded by the pump piston 12 and the cylindrical inner wall of the pump housing 10, and accordingly this vacuum takes the valve piston 20 with it. During the corresponding displacement movement of the valve piston 20, in synchronous motion with the pump piston 12, the valve piston 20 unblocks the entry point 22, thereby opening a fluid path from the outer circumferential side of the pump housing 10 into the pump chamber 30. At the same time, the valve piston 20, which is not shown in FIGS. 1 and 2, moves to the right under the negative pressure effect on the pressure-sensing surface 26 until the annular valve edge 32 on the pump housing 10 is completely passed over, thereby exposing a progressively widening gap as part of the fluid path between the valve piston 20 and the pump housing 10 in this region.

During a subsequent delivery stroke, in which the valve piston 12 moves towards the exit point 24, the volume in the pump chamber 30 decreases and the inlet valve 16 is opened for fluid discharge. This also results in a pressure increase at the pressure-sensing surface 26 and the energy accumulator or the compression spring 28 in a relevant operative connection with the pressure-sensing surface 26 pushes the valve piston 20 back into its left-hand stop position as shown in the FIGS.

The valve piston 20 of the inlet valve 16 is guided along a guide surface 34 on the outer circumferential surface of the pump housing 10, the valve piston 20 having a radial protrusion 36 on its inner side directed towards the pump housing 10, which protrusion in this respect forms the pressure-sensing surface 26 that in this respect extends substantially transverse to the longitudinal axis 37 of the pump piston 12.

As in particular FIG. 2 further shows, the said protrusion 36 of the valve piston 20 is guided along a corresponding recess 38 in the pump housing 10, the outside diameter of the cylindrical recess 38 being accordingly smaller than the outside diameter of the pump housing 10 which forms the guide surface 34. The difference in diameter between guide surface 34 and recess 38 of the pump housing 10 corresponds in this case to the difference in diameter at the protrusion 36 between the inner circumferential surface of the valve piston 20 in the region of the guide surface 34 and its inside diameter in the region of contact with the valve edge 32 in the vicinity of the recess 38.

In the unactuated state of the valve piston 20 as shown in FIGS. 1 and 2, the fluid path mentioned is blocked, as shown, between the pump chamber 30 and a fluid supply 40 (FIG. 1) via which the pump device draws fluid, for example, from a connected hydraulic circuit not shown in greater detail. A passage 42, for example in the form of a row of holes, is present in the pump housing 10 as part of the fluid path mentioned, said row of holes serving as a possible entry point 22 for the fluid. In the blocked state of the fluid path, the row of holes thereto, as the passage 42, is approximately half covered by the annular protrusion 36 of the valve piston 20. Furthermore, the valve piston 20 has on its free end face, which is directed towards the outlet valve 18, an annular recess 44 which is permanently connected to the fluid supply 40 in a fluid-conducting manner in each travel position of the valve piston 20. For this purpose, the valve piston 20 has individual passage points 46 in the region of its outer circumferential wall and extending through it which establish the permanent fluid connection thereto.

In addition, the valve piston 20 has a further annular recess 48 into which the passage 42 in the pump housing 10 opens in anterior travel positions of the valve piston 20, the two annular recesses 44, 48 of the valve piston 20 being spatially separated from each other by the internal protrusion 36 with the pressure-sensing surface 26. For obtaining improved actuation for the pressure-sensing surface 26, it is provided that on the outer circumferential side of the protrusion 36 directed towards the valve edge 32, there is a conical control surface 50 which tapers in diameter towards the annular valve edge 32. If the valve piston 20 moves to the right as seen in the viewing direction of FIG. 2, the pressure-sensing surface 26 can thereby come into contact with an end face 52 of the pump housing 10, which limits the row of holes as passage point 42. This fully pretensions the compression spring 28 which is supported with its one free end on an engagement surface 54 formed by a radial overhang on the valve piston 20. The other end of the compression spring 28 is supported at the same time on radially protruding parts of the pump housing 10 itself.

As further shown in FIG. 1, in the unactuated state of the actuating solenoid device 14, the pump piston 12 is held by means of a further energy accumulator, for example a further compression spring 56, in a rearward starting position in which the pump chamber 30 takes up its largest possible pump volume. At the same time, the compression spring 56 is supported with its one free end on parts of the pump housing 10 and with its other free end on a shoulder-like protrusion on the rearward end of the pump piston 12. In this respect, the pump piston 12 together with the compression spring 56 is accommodated in this region in a housing space 58 which is formed by outwardly projecting wall parts of the pump housing 10. The pump housing 10, which widens outwardly in this respect, is accommodated in a housing part 60 which tapers inwardly in steps and is screwed into a flange-like housing 62 in a sealed manner, the housing 62 being penetrated radially by the fluid supply 40 and having the fluid discharge 64 coaxial with the longitudinal axis 37 of the pump device together with the pump piston 12. Like the fluid supply 40, the fluid discharge 64 is part of a hydraulic circuit, not shown in greater detail, via which the pump device transfers fluid supplied via the fluid supply 40 to the fluid discharge 64 in a pumping manner. Hydraulic circuit is to be understood broadly here and includes the transport of any flowable medium, including in the form of aqueous urea solutions (Adblue).

The outlet valve 18 has a spring-loaded closing piston 66 which, counter to the action of a compression spring, is piloted open by the increasing pressure in the pump chamber 30, provided that the valve piston 12 reaches one of its anterior pumping positions and in the process discharges fluid from the pump chamber 30 and the exit point 24 towards the fluid discharge 64 when the outlet valve 18 is open. To achieve a good sealing effect, the closing piston 66, as shown in FIG. 2, is in contact with a valve seat 68, formed by wall parts of the screwed-in housing part 60, in the region of the fluid discharge 64. The relevant valve seat 68 is formed of a slope opening on one side into the cylindrical exit point 24 which in this region is formed jointly of parts of the pump housing 10 and the housing part 60. In addition, the valve seat 68 opens towards the annular fluid discharge 64 in the housing part 60. In the region of the valve piston 20, said valve piston is accommodated in a corresponding receptacle in the housing part 60 which has a plurality of fluid through-holes 70 that ensure the access of fluid via the fluid supply 40 and the passage points 46 into the annular recess 44 of the valve piston 20. In this respect, the fluid path towards the outlet valve 18 extends transverse to portions of the fluid path via the passage 42 in the pump housing 10.

The actuating solenoid device 14 has, in the usual design, a solenoid armature 74 which can be actuated via an energisable coil 72 which is guided so as to be longitudinally movable in a pole tube 76, specifically in a relevant armature chamber 78, which has an anti-adhesive disc 80 on its one free end face towards the pump piston 12. The pole tube 76 is screwed with associated wall parts into the housing part 60 and corresponding longitudinal ducts 82 ensure pressure-balanced operation for the solenoid armature 74 from its right-hand stop position shown in FIG. 1 to its anterior actuating position, which in contrast is towards the anti-adhesive disc 80, and vice versa. In this case, the solenoid armature 74 takes with it a rod part 84 which, activated by the solenoid armature 74, correspondingly takes with it the pump piston 12 for a delivery stroke. With the actuating solenoid device 14 de-energised, the pump piston 12 travels to its maximum intake stroke position under the action of the compression spring 56, resetting the rod 84 and thereby taking with it the solenoid armature 74 to its starting position shown in FIG. 1. The actuation for the pump piston 12 can be carried out in chronologically rapid succession via the control of the actuating solenoid of the solenoid device 14, so that a virtually continuous pump operation is ensured at the point of the fluid discharge 64, whereby considering the low volume of the pump chamber 30 only a small quantity discharge ever takes place. In particular for emergency actuations, however, the relevant volume quantity can be sufficient to actuate consumers within the hydraulic circuit in a functionally reliable manner.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A pump device comprising:
   a pump piston which is longitudinally movable in a pump housing and which, controlled by an actuating solenoid device, acts on an inlet valve and an outlet valve; wherein
   the inlet valve opens during an intake stroke of the pump piston, and the outlet valve opens during a delivery stroke thereof; wherein the inlet valve has an annular valve piston which encompasses the pump housing which has an entry point and an exit point for fluid; wherein
   the valve piston has a pressure-sensing surface which is controlled by the pump piston in such a manner that, during the intake stroke, the pressure-sensing surface of the valve piston is moved, counter to the action of an energy accumulator, in the movement direction of the pump piston and in the process vacates a fluid path into a pump chamber of the pump housing using the pump piston; wherein
   during the delivery stroke, the valve piston of the inlet valve, under the action of the energy accumulator and the pressure-sensing surface, blocks this fluid path and opens the outlet valve: and wherein
   the valve piston has on a free end face, which is directed towards the outlet valve, an annular recess which is permanently connected to a fluid supply in a fluid-conducting manner in each travel position of the valve piston.

2. The pump device of claim 1, wherein the valve piston of the inlet valve is guided along a guide surface on the outer circumferential surface of the pump housing; and wherein the valve piston has a protrusion on its inner side directed towards the pump housing, which protrusion forms the pressure-sensing surface that extends transverse to the longitudinal axis of the pump piston.

3. The pump device of claim 1, wherein a protrusion of the valve piston is guided along a corresponding recess in the pump housing; and wherein in the unactuated state of the valve piston, the fluid path between the pump chamber and a fluid supply is blocked.

4. The pump device of claim 1, wherein in the unactuated state, a protrusion of the valve piston with its axial overall length at least partially covers a passage in the pump housing as the entry point and part of the fluid path; and wherein, in the actuated state, at least partially passes over this passage and unblocks the fluid path to the fluid supply.

5. The pump device of claim 1, wherein the valve piston has a further annular recess into which the passage in the pump housing opens in each travel position of the valve piston; and wherein the two annular recesses of the valve piston are spatially separated from each other by an internal protrusion with the pressure-sensing surface.

6. The pump device of claim 1, wherein the valve piston has, on its outer circumferential surface, an engagement surface for the energy accumulator in the form of a compression spring which is supported with its other free end on the pump housing.

7. The pump device of claim 1, wherein the pump piston in the unactuated state is in a rearward starting position by means of a further energy accumulator, in which rearward starting position the pump chamber takes up its largest pump volume; and wherein, in the actuated state, the pump piston in the course of the delivery stroke delivers this pump volume in a forwards movement via the exit point and the outlet valve.

8. The pump device of claim 1, wherein the fluid path towards the outlet valve extends transverse to the fluid path via the passage in the pump housing.

9. The pump device of claim 1, wherein the actuating solenoid device has a solenoid armature which is actuatable via an energisable coil that acts on the pump piston via a rod part.

10. The pump device of claim 2, wherein the protrusion of the valve piston is guided along a corresponding recess in the pump housing; and wherein in the unactuated state of the valve piston, the fluid path between the pump chamber and a fluid supply is blocked.

11. The pump device of claim 2, wherein in the unactuated state, a protrusion of the valve piston with its axial overall length at least partially covers a passage in the pump housing as the entry point and part of the fluid path; and wherein, in the actuated state, at least partially passes over this passage and unblocks the fluid path to the fluid supply.

12. The pump device of claim 3, wherein in the unactuated state, the protrusion of the valve piston with its axial overall length at least partially covers a passage in the pump housing as the entry point and part of the fluid path; and wherein, in the actuated state, at least partially passes over this passage and unblocks the fluid path to the fluid supply.

13. The pump device of claim 4, wherein the passage is in the form of a row of holes.

14. The pump device of claim 7, wherein the further energy accumulator is in the form of a compression spring.

15. A pump device comprising:

a pump piston which is longitudinally movable in a pump housing and which, controlled by an actuating solenoid device, acts on an inlet valve and an outlet valve; wherein the inlet valve opens during an intake stroke of the pump piston, and the outlet valve opens during a delivery stroke thereof; wherein the inlet valve has an annular valve piston which encompasses the pump housing which has an entry point and an exit point for fluid; wherein the valve piston has a pressure-sensing surface which is controlled by the pump piston in such a manner that, during the intake stroke, the pressure-sensing surface of the valve piston is moved, counter to the action of an energy accumulator, in the movement direction of the pump piston and in the process vacates a fluid path into a pump chamber of the pump housing using the pump piston; wherein during the delivery stroke, the valve piston of the inlet valve, under the action of the energy accumulator and the pressure-sensing surface, blocks this fluid path and opens the outlet valve; and wherein the valve piston has, on its outer circumferential surface, an engagement surface for the energy accumulator in the form of a compression spring which is supported with its other free end on the pump housing.

16. The pump device of claim 15, wherein the valve piston of the inlet valve is guided along a guide surface on the outer circumferential surface of the pump housing; and wherein the valve piston has a protrusion on its inner side directed towards the pump housing, which protrusion forms the pressure-sensing surface that extends transverse to the longitudinal axis of the pump piston.

17. The pump device of claim 15, wherein a protrusion of the valve piston is guided along a corresponding recess in the pump housing; and wherein in the unactuated state of the valve piston, the fluid path between the pump chamber and a fluid supply is blocked.

18. The pump device of claim 15, wherein in the unactuated state, a protrusion of the valve piston with its axial overall length at least partially covers a passage in the pump housing as the entry point and part of the fluid path; and wherein, in the actuated state, at least partially passes over this passage and unblocks the fluid path to the fluid supply.

19. The pump device of claim 15, wherein the valve piston has on a free end face, which is directed towards the outlet valve, an annular recess which is permanently connected to the fluid supply in a fluid-conducting manner in each travel position of the valve piston.

20. The pump device of claim 19, wherein the valve piston has a further annular recess into which the passage in the pump housing opens in each travel position of the valve piston; and wherein the two annular recesses of the valve piston are spatially separated from each other by an internal protrusion with the pressure-sensing surface.

21. The pump device of claim 15, wherein the pump piston in the unactuated state is in a rearward starting position by means of a further energy accumulator, in which rearward starting position the pump chamber takes up its largest pump volume; and wherein, in the actuated state, the pump piston in the course of the delivery stroke delivers this pump volume in a forwards movement via the exit point and the outlet valve.

22. The pump device of claim 15, wherein the fluid path towards the outlet valve extends transverse to the fluid path via the passage in the pump housing.

23. The pump device of claim 15, wherein the actuating solenoid device has a solenoid armature which is actuatable via an energisable coil that acts on the pump piston via a rod part.

* * * * *